United States Patent

Suzuki

[15] 3,671,682

[45] June 20, 1972

[54] AUTOMATIC CARTRIDGE PLAYING SYSTEM

[72] Inventor: Tsutomu Suzuki, Yokohama, Japan

[73] Assignee: Pioneer Electronic Corporation, Ohtaku, Tokyo, Japan

[22] Filed: June 5, 1970

[21] Appl. No.: 43,882

[30] Foreign Application Priority Data

June 7, 1969 Japan..................................44/44797

[52] U.S. Cl...........................................179/100.2 Z, 274/4 F

[51] Int. Cl...........................................................G11b 5/02

[58] Field of Search..........................179/100.2 Z, 100.2 MI; 274/4 F

[56] References Cited

UNITED STATES PATENTS 3,247,328 4/1966 Mitchell et al. .................179/100.2 Z 3,140,360 7/1964 Whitworth ......................179/100.2 Z 3,109,898 11/1963 Gray...............................179/100.2 Z 3,126,162 3/1964 MacKenzie..............179/100.2 Z UX 3,127,178 3/1964 Osborne et al...........179/100.2 Z UX 3,244,378 4/1966 Rost................................274/4 F UX 3,453,397 7/1969 Miller et al......................179/100.2 Z 3,511,508 5/1970 Ban .......................................274/4 F

*Primary Examiner*—Malcolm A. Morrison

*Assistant Examiner*—Jerry Smith

*Attorney*—Sughrue, Rothwell, Mion, Zinn & Macpeak

[57] ABSTRACT

An automatic cartridge playing system which has a start-switch means, a selective switch means for selecting in advance a predetermined cartridge, and a tape end detecting means for detecting the end of a magnetic tape. The device also has a rotary switch group, a rotary switch rotating means for rotating the rotary switch group by any of the start-switch means, and a selective switch means or tape end detecting means. The device further has holding means for holding one or more cartridges operative by the first rotary switch of the rotary switch group, a magnetic head held in reproduceable state by the second rotary switch of the selective switch means and rotary switch group, and reproducing means for amplifying the output of the magnetic head and for increasing the volume of its output. Thus, the automatic cartridge playing system of this invention may selectively and automatically play any cartridge or cartridges in preset order.

5 Claims, 4 Drawing Figures

PATENTED JUN 20 1972

3,671,682

INVENTOR.

TSUTOMU SUZUKI

BY Sughrue, Rothwell, Mion, Zinn & Macpeak

ATTORNEYS

AUTOMATIC CARTRIDGE PLAYING SYSTEM

BACKGROUND OF THE INVENTION

1, Field of the Invention

This invention relates to an automatic tape cartridge playing system, and more particularly to a system for automatically and continuously reproducing selectively recorded magnetic tapes contained within the respective cartridges in a predetermined order.

2. Description of the Prior Art

Cartridges which are convenient for carrying and handling magnetic tapes and playing systems for reproducing the recordings on the tapes, have recently been developed. However, the recording time of one cartridge is not very long because the length of the magnetic tape in the cartridge is not very long. If longer magnetic tapes were on a cartridge, it would require skillful operation to select a desired portion from a long magnetic tape. In the case of endless magnetic tape, it is difficult to operate in a fast forward or rewind mode, with the result that it takes a long time to select a particular portion of the tape for playback.

SUMMARY OF THE INVENTION

This invention contemplates the elimination of the aforementioned disadvantages of the conventional system and provides a novel and improved automatic cartridge playing system which may instantly select a desired portion of a tape and automatically reproduce it.

According to one aspect of the present invention, there is provided an automatic cartridge playing system which comprises start-switch means, selective switch means for selecting in advance a predetermined cartridge, and tape end detecting means for detecting the end of a magnetic tape. The device also includes a rotary switch group, rotary switch rotating means for rotating the rotary switch group by any of the start-switch means, and selective switch means or tape end detecting means. The device further comprises holding means for holding one or more cartridges operative by the first rotary switch of the rotary switch group, a magnetic head held in a reproduce state by the second rotary switch of the selective switch means and rotary switch group, and reproducing means for amplifying the output of the magnetic head and for increasing the volume of its output.

Other objects, advantages and features of the present invention will become apparent from the following description taken in conjunction with the accompanying drawings.

DESCRIPTION OF THE PREFERRED EMBODIMENTS

Figures 1, 2, 3, 4:
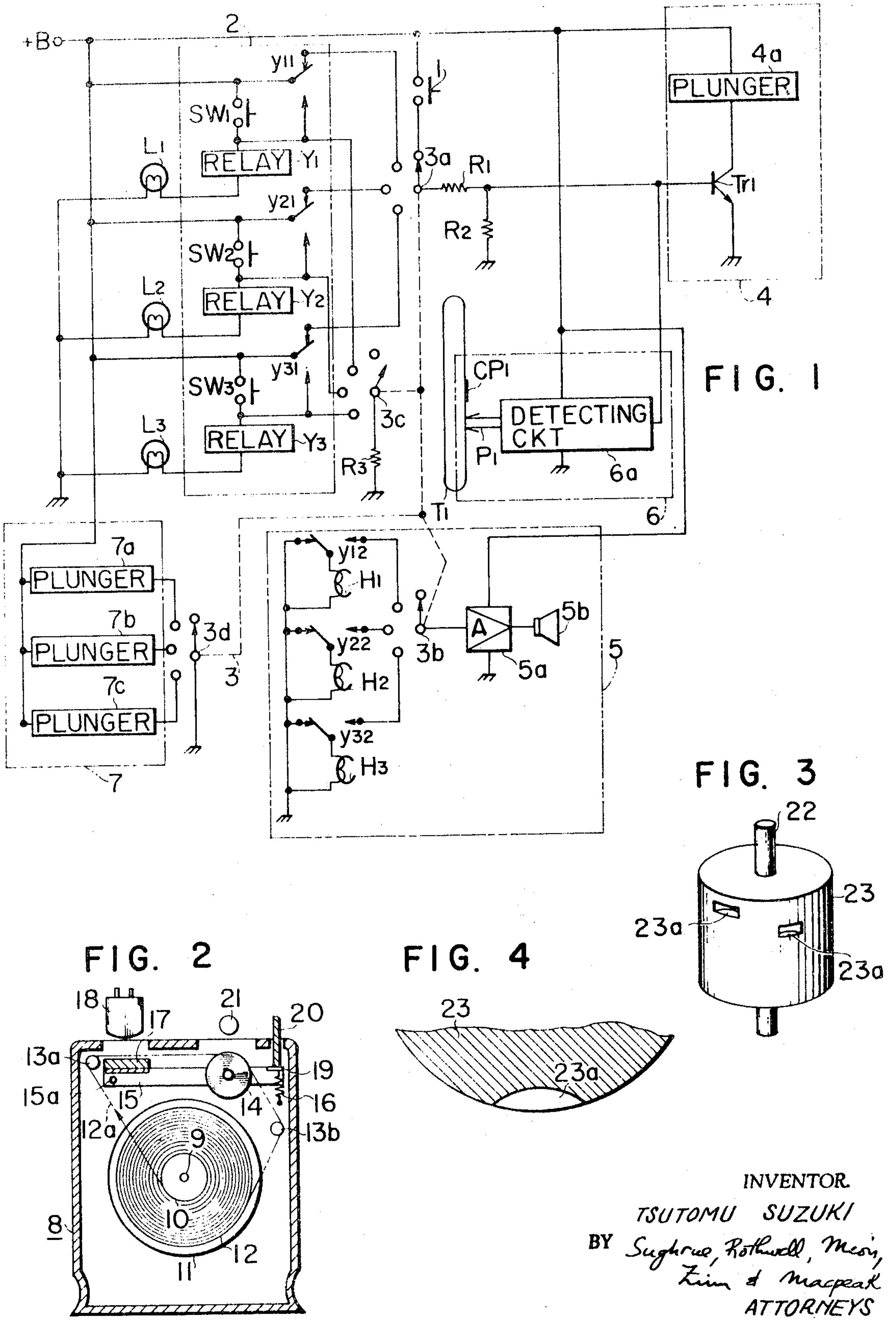
FIG. 1 is a wiring diagram of one embodiment of an automatic cartridge playing system for showing an operating principle in accordance with the present invention.
FIG. 2 is an explanatory sectional view of one example of a cartridge used in the system of this invention showing the internal structure thereof.
FIG. 3 is a perspective view of one embodiment of part of the playing system.
FIG. 4 is an explanatory enlarged sectional view of part of the component shown in FIG. 3.

Reference is now made to the drawings, which show one embodiment of this invention.

The system comprises a push-button start-switch 1, a selective switch 2 which includes push-button switches SW1, SW2 and SW3 and relays Y1, Y2 and Y3 having contacts *y*11, *y*21 and *y*31 respectively, for selecting in advance a predetermined or desired cartridge from a plurality of cartridges. The selective switch 2 also includes lamps L1, L2 and L3 for indicating the operation of the cartridge. The system also includes a rotary switching device which includes rotary switches 3*a*, 3*b*, 3*c* and 3*d*, and rotary switch rotating device 4 which includes a transistor T*r*1 and a plunger 4*a* for rotating the rotary switch group. The device further contains a reproducing device 5 which includes magnetic heads H1, H2 and H3, an amplifier 5*a* for amplifying the outputs of the magnetic heads H1, H2 and H3, and a speaker 5*b*. The reproducing device 5 also includes contacts *y*12, *y*22 and *y*32 connected in the head circuits, respectively, and rotary switch 3*b* of the rotary switching device 3 for switching the connection of the heads H1, H2 and H3 to the amplifier 5*a*. A tape end detecting device 6 includes electrodes P1, P2 and P3 (P2 and P3 are not shown) which are short-circuited by conductive foils CP1, CP2 and CP3 (CP2 and CP3 are not shown) affixed to the magnetic tapes T1, T2 and T3 (T2 and T3 are not shown). The system also includes a tape end detecting circuit 6*a* for producing a positive voltage which turns on transistor T*r*1 when the electrodes are short-circuited by the foil on the magnetic tapes. A holding device 7 which includes plungers 7*a*, 7*b* and 7*c* is selectively operated by the rotary switch 3d and a mechanism for holding a predetermined or selected cartridge in operation with a magnetic tape drive device and magnetic head.

In the connection of the thus constructed system, the start-switch 1 is connected between positive voltage source +B and one contact of the rotary switch 3*a*. The other contacts of the rotary switch 3*a* are connected respectively to one of the contacts of *y*11, *y*21 and *y*31 of the relays Y1, Y2 and Y3. The other contacts of *y*11, *y*21 and *y*31 of the relays Y1, Y2 and Y3 are connected to both the contacts of the rotary switch 3*c*, respectively, and to the relays Y1, Y2 and Y3 and to one side of the push-button switches SW1, SW2 and SW3, respectively. The arm contacts of the switches, *y*11, *y*21 and *y*31 are connected to both the positive voltage source +B and the other contacts of the push-button switches SW1, SW2 and SW3. The other side of the relays Y1, Y2 and Y3 are connected through the lamps L1, L2 and L3 to ground. The arm contact of the rotary switch 3*c* is connected through the resistor R3 to ground. The arm contact of the rotary switch 3*a* is connected through the resistor R1 to both the base of the transistor T*r*1 and through the resistor R2 to ground. The emitter of the transistor T*r*1 is connected to ground and the collector of the transistor T*r*1 is connected to one side of the plunger 4*a*. The other side of the plunger 4a is connected to the positive voltage source +B. The heads H1, H2 and H3 are connected between ground and through switches *y*12, *y*22 and *y*32 to the contacts of the rotary switch 3*b*. The arm contact of the rotary switch 3*b* is connected to the input of the amplifier 5*a*. The output of the amplifier 5*a* is connected to the speaker 5*b* and positive voltage source +B is connected to the amplifier 5*a*. The detecting circuit 6*a* has an input from the electrodes P1, P2 and P3 and an output connected to the base of the transistor T*r*1. The contacts of the rotary switch 3*d* are connected to one side of the plungers 7*a*, 7*b* and 7*c*. The other sides of the plungers 7*a*, 7*b* and 7*c* are connected to the positive voltage source +B. The arm contact of the switch 3*d* is connected to ground.

In operation of the system shown in FIG. 1, if the push-button start-switch 1 is depressed, a positive voltage is applied through the rotary switch 3*a* and resistor R1 to the base of the transistor T*r*1 so that transistor T*r*1 becomes conductive during closure of the switch 1. This results in collector current flow through the plunger 4a so as to rotate the plunger 4*a* one revolution. When the plunger 4a is rotated one revolution, the rotary switches 3*a*, 3*b*, 3*c* and 3*d* are rotated one contact in the counterclockwise direction. When the rotary switches 3*a*, 3*b*, 3*c* and 3*d* are thus rotated, a positive voltage is applied through the switch y11 of the relay Y1 and through the rotary switch 3*a* and resistor R1 to the base of the transistor T*r*1 so that the transistor T*r*1 again becomes conductive and again operates plunger 4*a*. The rotary switch 3*a* is thus rotated one contact at a time. Before the start-switch 1 is depressed, if any of the push-button switches such as SW1 and SW3 are depressed, the relays Y1 and Y3 are energized so that the switches *y*11 and *y*31 of the relays Y1 and Y3 are closed thereby holding the circuit closed for energizing relays Y1 and Y3 and operating indicating lamps L1 and L3. In this state, if the start-switch 1 is depressed, the positive voltage is applied through the start-switch 1, rotary switch *3a* and resistor R1 to the base of the transistor T*r*1. T*r*1 becomes conductive and collector current flows through the plunger *4a* with the result that the rotary switches *3a*, *3b*, *3c* and *3d* are rotated accordingly, step by step. However, since the switch *y*11 of the relay Y1 is switched to the other side as shown in FIG. 1, the positive voltage is not applied to the rotary switch *3a* and transistor T*r*1 does not become conductive. Therefore, plunger 4a does not operate, and accordingly, the respective rotary switches are not rotated any further.

Due to the operation of the relay Y1 and the position of switch *y*12 of the relay Y1 as shown in FIG. 1, the magnetic head H1 reproduces the magnetic tape T1 of the cartridge CA1. The reproduced signal is fed through the rotary switch *3b* to the amplifier *5a* to be amplified thereby and then to be communicated by the speaker *5b*.

A device for engaging a predetermined cartridge with a predetermined magnetic head and feeding the magnetic tape contained within the cartridge will be hereinafter described.

When the endless magnetic tape T1 is completely reproduced by the magnetic head H1, the conductive foil CP1 affixed to the end of the magnetic tape short-circuits the electrode P1. The detecting circuit *6a* detects the short circuit and feeds its output to the base of the transistor T*r*1 so that the transistor T*r*1 becomes conductive. Accordingly, similar to the operation described above, the respective rotary switches *3a*, *3b*, *3c* and *3d* rotate one contact. When the rotary switches *3a*, *3b*, *3c* and *3d* are rotated one contact, the positive voltage is applied through the switch *y*21 of the relay Y2, rotary switch *3a* and resistor R1 to the base of the transistor Tr1 so that the transistor T*r*1 becomes conductive again resulting in collector current flowing through the plunger *4a* so that the respective rotary switches are rotated one contact. Here, since the relay Y3 is held energized in advance as previous described, the switch *y* 31 which is switched to the other side as shown in FIG. 1, and the positive voltage is not applied to the rotary switch *3a*. Accordingly, the transistor T*r*1 does not become conductive and the respective rotary switches are stopped. This results in cartridge CA2 not being played or passed therethrough and cartridge CA3 is placed in a playing state. When endless magnetic tape T3 contained within the cartridge CA3 is played, the conductive foil CP3 affixed on the end of the magnetic tape short-circuits the electrode P3 which is connected in parallel with electrode P1. The detecting circuit *6a* operates and applies a positive output voltage to the base of the transistor T*r*1 resulting in transistor T*r*1 becoming conductive. Collector current therefore flows through the plunger *4a* and the respective rotary switches are again rotated one contact.

The operation of the rotary switch 3*c* will now be described. While the other rotary switches *3a*, *3b* and *3d* are rotating one contact, the rotary switch *3c* grounds the fixed contacts thereof through the resistor R3. When the rotary switches are not rotated, the arm or sliding contact of *3c* is disposed between the adjacent fixed contacts. In the sequential operation previously described, when the rotary switch *3a* is switched from the contact *y*11 to the contact *y*21, the rotary switch *3c* grounds the positive side of the relay *y*1 through the resistor R3. For this reason, the relay Y1 is de-energized and self-holding contact *y*11 is returned to its original state. Thus, the rotary switch *3c* releases the self-holding switches of the relays Y1, Y2 and Y3 so the cartridges when finished return to their original states.

If the tape recorder comprises, for example, three cartridges as shown in FIG. 1, after the play of the cartridge CA3 is finished, the rotary switches *3a*, *3b*, *3c* and *3d* are rotated to the position as shown in FIG. 1 to complete the series of operation.

Though the magnetic tapes T2 and T3, the conductive foils CP2 and CP3 affixed to the tapes respectively, and electrodes P2 and P3 short-circuited thereby are not shown in the drawing, these are entirely the same as those of the magnetic tape T1, conductive foil CP1 and electrode P1. The respective electrodes are connected in parallel with the electrode P1 and if any electrode is short-circuited, the detecting circuit *6a* is operated.

Though the detecting circuit *6a* feeds one positive pulse signal to the base of the transistor T*r*1 for every short-circuit of each electrode if the magnetic tape has four tracks, that is, two channels as stereo recording, the magnetic tape switches its channel by the known means upon completion of one endless loop. The system may be designed such that one pulse is generated from the detecting circuit *6a* upon two revolutions of an endless loop. In the case of eight track magnetic tape in stereo recording, the system may be designed so as to generate one pulse from the detecting circuit *6a* whenever the electrode P1 is short-circuited four times. Thus, after all channels of one cartridge are completed, the system may be transferred automatically to the next cartridge.

Referring to FIGS. 2, 3 and 4, which show another embodiment for playing the tape in the cartridge without using the plungers *7a*, *7b* and *7c* shown in FIG. 1, FIG. 2 shows the internal structure of a particular cartridge 8, FIG. 3 shows a drum switch 23 rotating integrally with the respective rotary switches *3a*, *3b* and *3c* of the previous embodiment, and FIG. 4 shows part of the switch drum 23 in particular structure. Another embodiment will now be described.

Referring to FIG. 2, a spool 10 and a tape-resting disc 11 are integral with the rotary shaft 9 within the cartridge 8. Magnetic tape 12 is wound in endless manner onto the spool 10. The magnetic tape 12 is drawn from the inner periphery of the spool of the tape so that the tape is fed in the direction as shown by arrow *12a*. The tape 12 is taken up on the outer periphery through the guide roller *13a*, pinch roller 14 and guide roller *13b*. The pinch roller 14 is rotatably provided on the lever 15. The lever 15 is pivoted in the outward direction around the shaft *15a* by means of a spring 16. A pad 17 is affixed to the lever 15 so that the magnetic tape 12 is depressed onto the lever 15 upon playing of the tape recorder. Further, a projection 19 is provided on the lever 15. This projection is urged onto the rod 20. If the magnetic tape 12 is not interleaved between the pinch roller 14 and the capstan 21 the tape cannot run, that is, it cannot be played.

Switch drum 23 integrally provided with the shaft 22 of the rotary switch device 3 has recess *23a* for engaging the rod 20 at the position corresponding to the respective rotary switch.

A plurality of cartridges 8, for example, three for the embodiment shown in FIG. 1 are positioned to correspond to the respective magnetic heads and common capstans. The switch drum 23 is integrally rotated with the respective rotary switch, one end of the rod 20 is inserted into the respective cartridge 8 and is slid along the surface of the switch drum 23 until it goes into recess *23a*. Whereupon, the other end of the rod 20 is drawn from the cartridge 8 and lever 15 is rotated by the force of the spring 16. The result is that the magnetic tape 12 is interleaved between the magnetic head 18 and the pad 17, and between the capstan 21 and the pinch roller 14, and is thereby reproduced.

It should be understood from the foregoing description that according to the present invention any number of cartridges may be automatically played by this extremely simple system, and if a desired cartridge is selected previously and the switches SW1, SW2...SW*n* corresponding thereto are depressed previously, the selected cartridge is indicated by the lamps L1, L2...L*n*. The selected cartridges may be continuously and automatically played and when the completed cartridge is released from the playing state the cartridge is also returned to its original state.

I claim:

1. An automatic cartridge reproducing system for a tape recorder comprising:
   a. start switch means;
   b. selective switch means for selecting from a plurality of magnetic tape cartridges those cartridges which are to be reproduced by said tape recorder;

c. tape and detecting means for determining the end of the magnetic tape in said cartridges;

d. a rotary switch device comprising a plurality of rotary switch means;

e. a first rotary switch means of said plurality of rotary switch means, connected to said selective switch means, for sequentially connecting each switch of said selective switch means;

f. holding means, coupled to a second rotary switch means of said plurality of rotary switch means, for maintaining each of the selected ones of said plurality of magnetic tape cartridges in a reproduce state during the reproduction of the magnetic tape;

g. magnetic head means for reproducing the magnetic tapes;

h. a third rotary switch means of said plurality of rotary switch means, coupled to said magnetic head means, for holding said magnetic head means in a reproduce state corresponding to the selected ones of said plurality of magnetic tape cartridges; and i. rotary switch rotating means, coupled to said start switch means, said selective switch means, and said tape end detecting means, for rotating said plurality of rotary switch means in response to the actuation of said start switch means, said selective switch means and said tape end detecting means, whereby upon actuation of said start switch means said system automatically sequentially reproduces each selected magnetic tape cartridge.

2. An automatic cartridge playing system as set forth in claim 1, wherein said start-switch is a push-button switch, and said selective switch means includes a plurality of push-button switches, a plurality of relays having a plurality of contacts, and a plurality of lamps for indicating the operation of a corresponding cartridge wherein a plurality of series circuits are formed by each of said pushbutton switches and a corresponding relay and lamp.

3. An automatic cartridge playing system as set forth in claim 1, wherein said tape end detecting means includes a plurality of electrodes to be short-circuited by a plurality of conductive foils affixed to the magnetic tapes.

4. An automatic cartridge playing system as set forth in claim 1, wherein said rotary switch rotating means includes a transistor and a plunger connected in the collector circuit of said transistor.

5. An automatic cartridge playing system as set forth in claim 1, wherein said holding means includes a plurality of plungers selectively operated by said second rotary switch means and means for holding a predetermined cartridge in operation with a magnetic tape drive.

* * * * *